US011620061B1

(12) United States Patent
Brinicombe

(10) Patent No.: US 11,620,061 B1
(45) Date of Patent: *Apr. 4, 2023

(54) SYSTEM AND METHOD FOR MANAGING BUFFERS IN A COMPUTER SYSTEM

(71) Applicant: Yellowbrick Data, Inc., Palo Alto, CA (US)

(72) Inventor: Mark Brinicombe, San Mateo, CA (US)

(73) Assignee: Yellowbrick Data, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,172

(22) Filed: Jun. 1, 2021

Related U.S. Application Data

(63) Continuation of application No. 16/596,672, filed on Oct. 8, 2019, now Pat. No. 11,023,146, which is a continuation of application No. 15/976,790, filed on May 10, 2018, now Pat. No. 10,437,496.

(60) Provisional application No. 62/504,483, filed on May 10, 2017.

(51) Int. Cl.
*G06F 12/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0656* (2013.01)

(58) Field of Classification Search
CPC .... G06F 3/0631; G06F 3/0604; G06F 3/0656; G06F 3/067
See application file for complete search history.

(56) References Cited

U.S. PATENT DOCUMENTS

| | | | | |
|---|---|---|---|---|
| 5,790,770 A * | 8/1998 | McClure | ............... | H04L 49/506 370/388 |
| 7,408,875 B2 * | 8/2008 | Garmire | ............... | H04L 49/9063 370/428 |
| 9,917,790 B2 * | 3/2018 | Kuznetsov | ............ | H04L 47/762 |
| 10,642,772 B1 * | 5/2020 | Wentzlaff | .......... | G06F 15/17337 |
| 2002/0178306 A1 * | 11/2002 | Shimizu | ................ | H04L 49/901 710/56 |
| 2003/0193892 A1 * | 10/2003 | Sharma | ................. | H04L 47/527 370/412 |
| 2004/0019714 A1 * | 1/2004 | Kelley | ................... | G06F 13/385 710/52 |
| 2005/0226146 A1 * | 10/2005 | Rider | ................... | H04L 49/9063 370/229 |
| 2006/0050639 A1 * | 3/2006 | Stuart | ..................... | H04L 47/39 370/235 |
| 2011/0075555 A1 * | 3/2011 | Ziegler | ................. | H04L 49/555 370/229 |
| 2018/0217777 A1 * | 8/2018 | Jiang | ..................... | G06F 3/0608 |
| 2020/0050396 A1 * | 2/2020 | Keil | .................... | G06F 13/1621 |

* cited by examiner

*Primary Examiner* — John A Lane
(74) *Attorney, Agent, or Firm* — Innovation Partners LLC; Charles E. Gotlieb

(57) ABSTRACT

A system and method provides an integrated buffer management with flow control, in some cases via credits that may be redeemed for buffers, and interprocess communication.

18 Claims, 6 Drawing Sheets

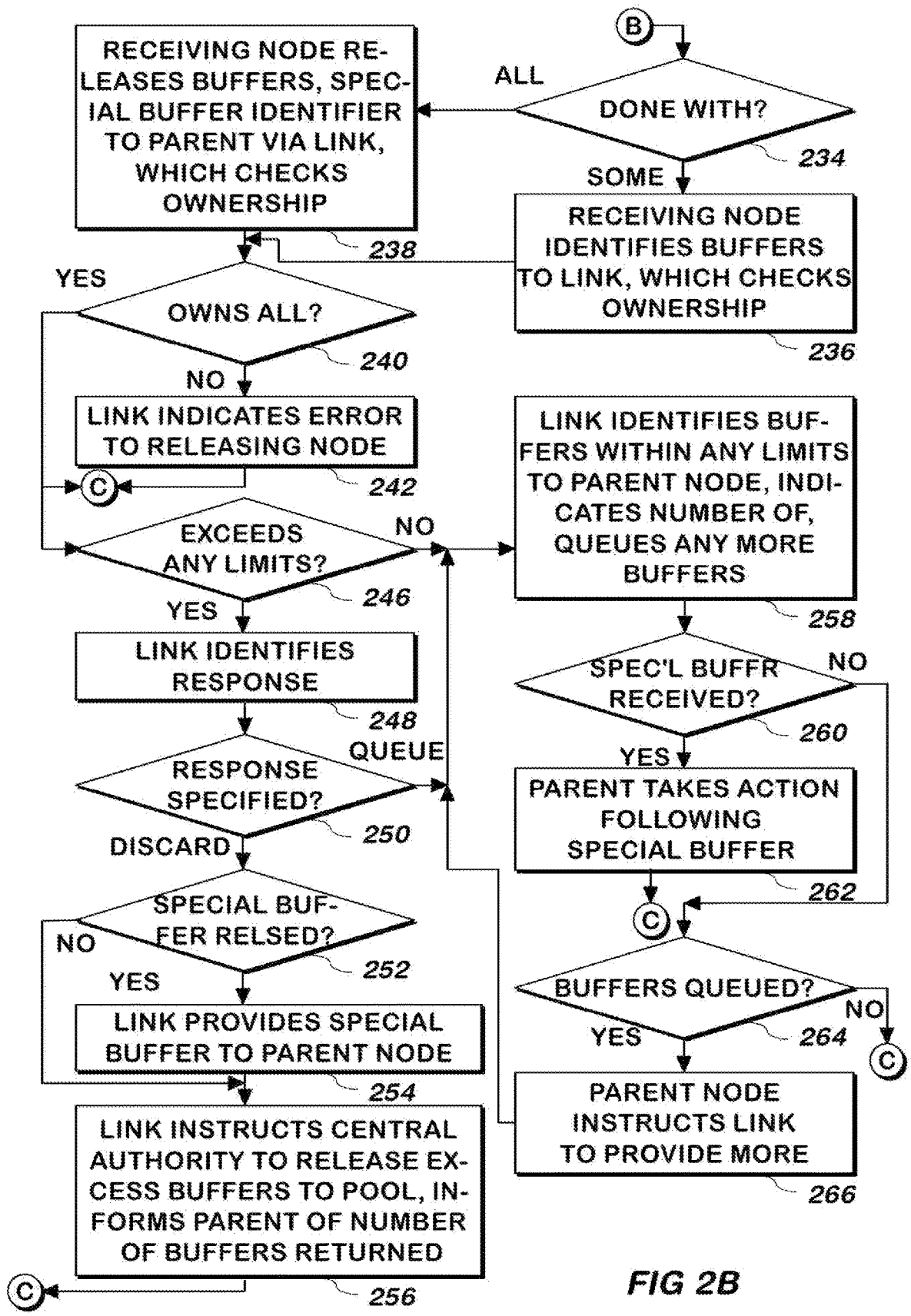

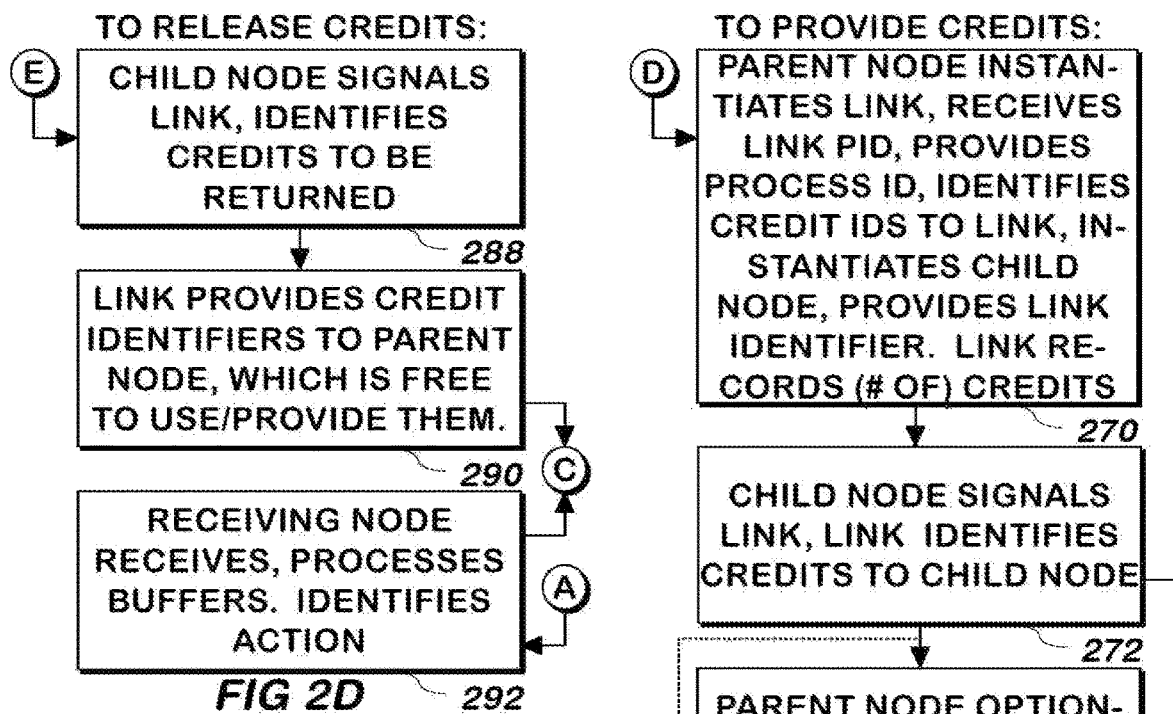
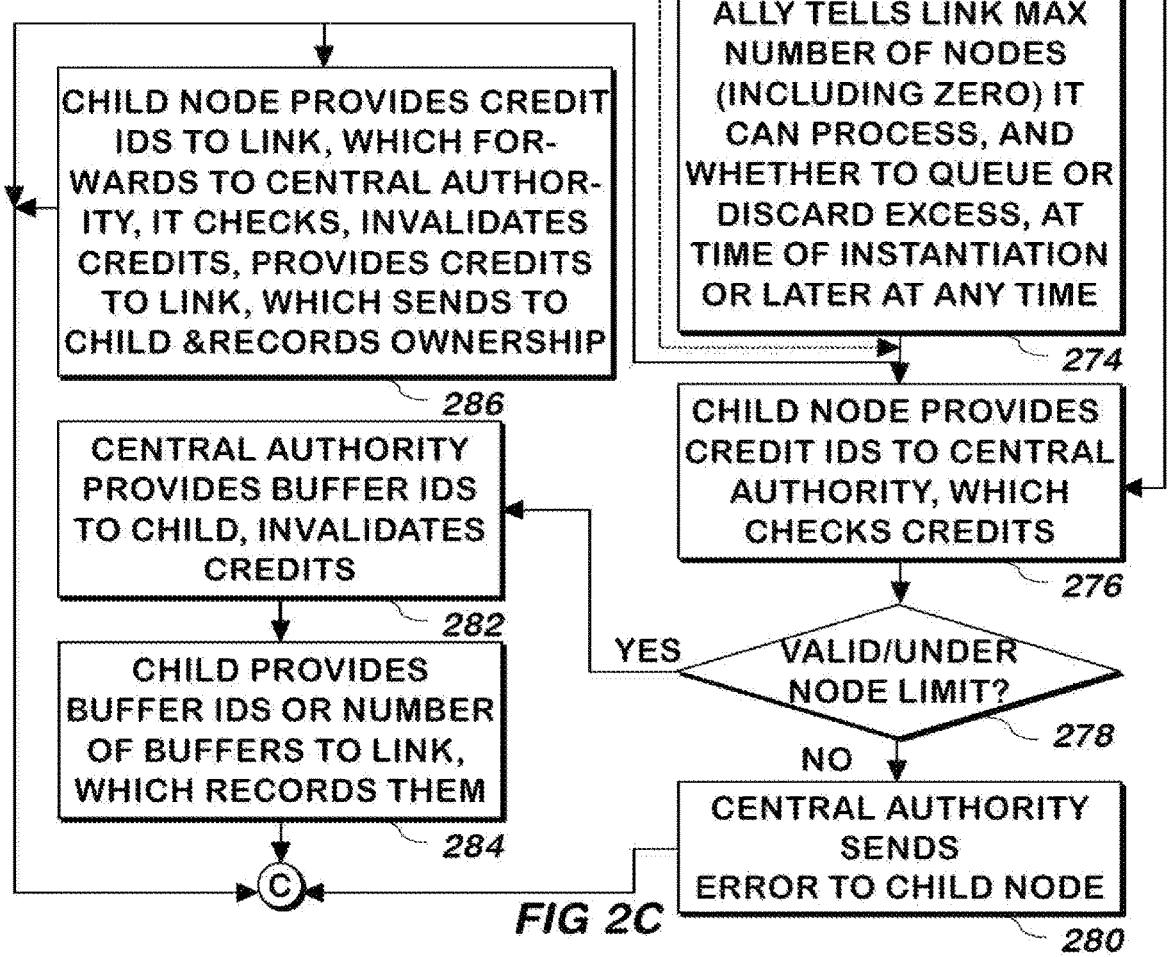
FIG 2D
FIG 2C

SYSTEM AND METHOD FOR MANAGING BUFFERS IN A COMPUTER SYSTEM

RELATED APPLICATIONS

This application is a continuation of U.S. patent application Ser. No. 16/596,672 entitled, System and Method for Managing Buffers in a Computer System" filed by Mark Brinicombe on Oct. 8, 2019, which is a continuation of U.S. patent application Ser. No. 15/976,790 entitled, "System and Method for Managing Buffers in a Computer System" filed by Mark Brinicombe on May 10, 2018, which claims the benefit of U.S. Provisional Patent Application Ser. No. 62/504,483 entitled, "Method and Apparatus for Managing Buffers in a Computer System" filed on May 10, 2017 by Mark Brinicombe, each having the same assignee as the present application and each is hereby incorporated by reference in its entirety.

FIELD OF THE INVENTION

The present invention is related to computer software and hardware and more specifically to computer software and hardware for managing buffers in a computer system.

BACKGROUND OF THE INVENTION

Conventional buffer management and interprocess communication methods and systems in computer systems are suboptimal. What is needed is a system and method for buffer management and interprocess communication.

SUMMARY OF INVENTION

A system and method allows buffers, or credits that may be redeemed for buffers, to be requested by a node, which is a software or hardware process, from a central authority, and provided to a child node. The child node may process data using one or more buffers and/or pass it to a child node of its own, and/or may release it to the parent node.

Credits may be redeemed for buffers by a child node that receives them, for example, when it requires use of them, and not all credits received need be redeemed.

The central authority uses policies for each type of node to determine a maximum number of buffers that may be outstanding by, or on behalf of, a node. When a node requests buffers, the node provides a unique identifier of the node and provides its type, and the central authority ensures that it does not issue more buffers to any node than the difference between any buffers outstanding for that node and the maximum allowed by the policy for that type of node. The central authority maintains a list or count of the buffers and/or credits issued to each of several nodes that requested them. Nodes may return a buffer to the central authority, and the central authority credits with the returned node the node that requested the buffer, or the credit for which the buffer was redeemed.

A link is used to pass buffers or credits between a node and its child node and is instantiated by one of the two nodes with which it communicates. The link maintains a list or number of buffers received by each node as being owned by that node. When a node returns or releases buffers via the link, the link ensures the returning/releasing node owns the buffer or owns at least as many buffers as are being returned or released, flags an error otherwise, and then accounts for the transfer of ownership. Identifiers of, or a number of, buffers a node received without involving the link may be provided by a node to the link to include in the link's accounting of buffers owned by that node.

A parent node may instruct the child node what to do with the buffers provided to it, such as retrieve data at a location the parent provides, and perform a function as specified by the parent or a default function. The child node performs the function, optionally via one or more child nodes of its own, and then may return or release one or more buffers. Data may be passed using the buffers.

When a node redeems credits for buffers, the central authority provides a buffer in exchange for each credit the node supplies to it, provided the credit was issued and not already redeemed, and that the number of buffers outstanding for the node that originally requested the credit from the central authority would not be greater than the maximum allowed by the policy for the type of node that originally requested the credit from the central authority after the credits are redeemed. The type of node redeeming the credit and the number of buffers it has outstanding are not part of the criteria for issuing the buffer used by the central authority unless a node is redeeming credits obtained directly from the central authority. The central authority charges each buffer to the node that requested the credit in its accounting. In an exception case, the central authority will issue the buffers up to the maximum under the policy and provide an error for the rest. A node may redeem credits via the link from which the credits were received or may redeem them directly from the central authority.

At any time after instantiating the link, the parent node that instantiated the link may instruct the link a maximum number of buffers that it will accept from that link at any time and what to do with any excess: queue the excess or discard it. The link will comply with such instructions. If buffers are "discarded", they may be returned by the link to the central authority, which credits them against the node that requested them, or requested the credits redeemed to obtain the buffers, directly from the central authority. A node may have several children, each with their own links, and their own different instructions regarding the maximum and what to do with any excess.

A node may release buffers to its parent. Buffers received from the parent and/or those requested from the central authority may be released to a parent node. When a node has finished processing using the buffers that were provided to it, the node releases a special buffer to the parent that indicates it is finished processing. In one embodiment the link releases the special buffer at the end of releasing all buffers, and in one embodiment, the special buffer is released to the parent node even if the parent node has indicated no buffers should be provided to it upon release and any buffers released should all be discarded. When it receives the special buffer, the parent may then kill the child node or leave it running and provide buffers for a different function or the same function to be performed using different data. Other processing may be performed upon the receipt of the special buffer. The special buffer may be a buffer with a flag set, either in the buffer address or in the buffer itself or it may be a buffer with a given address that will never correspond to a buffer other than a special buffer.

There may be any number of parent nodes and each node may have zero or more child nodes. There may be any number of generations of nodes descending from a parent node, with any number of child nodes at each generation. Buffers may be requested at any time in any number and in any number of attempts. Buffers received may be used, forwarded to a child node of the recipient, released, or returned in any number. Any number of buffers may be attempted to be returned at any time.

DETAILED DESCRIPTION OF A PREFERRED EMBODIMENT

Figure 1:
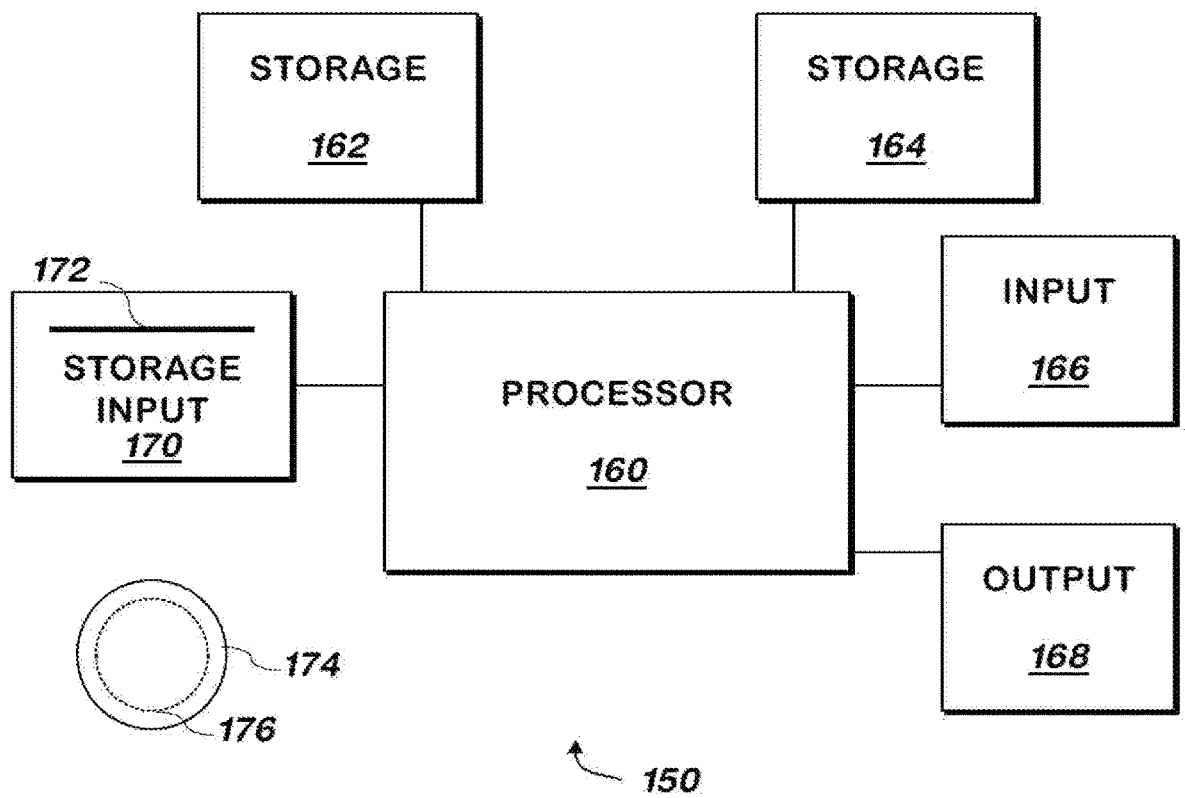
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif.

Various computer systems may be employed, with the various computer systems communicating with one another via the Internet, a conventional cellular telephone network, an Ethernet network, or all of these.

Figure 2:
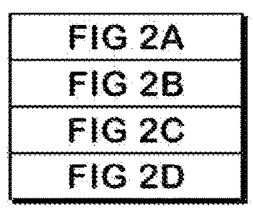
FIG. 2, consisting of FIG. 2A, FIG. 2B, FIG. 2C and FIG. 2D, is a flowchart illustrating a method of managing buffers and facilitating communication between processes according to one embodiment of the present invention.
Figure 2A:
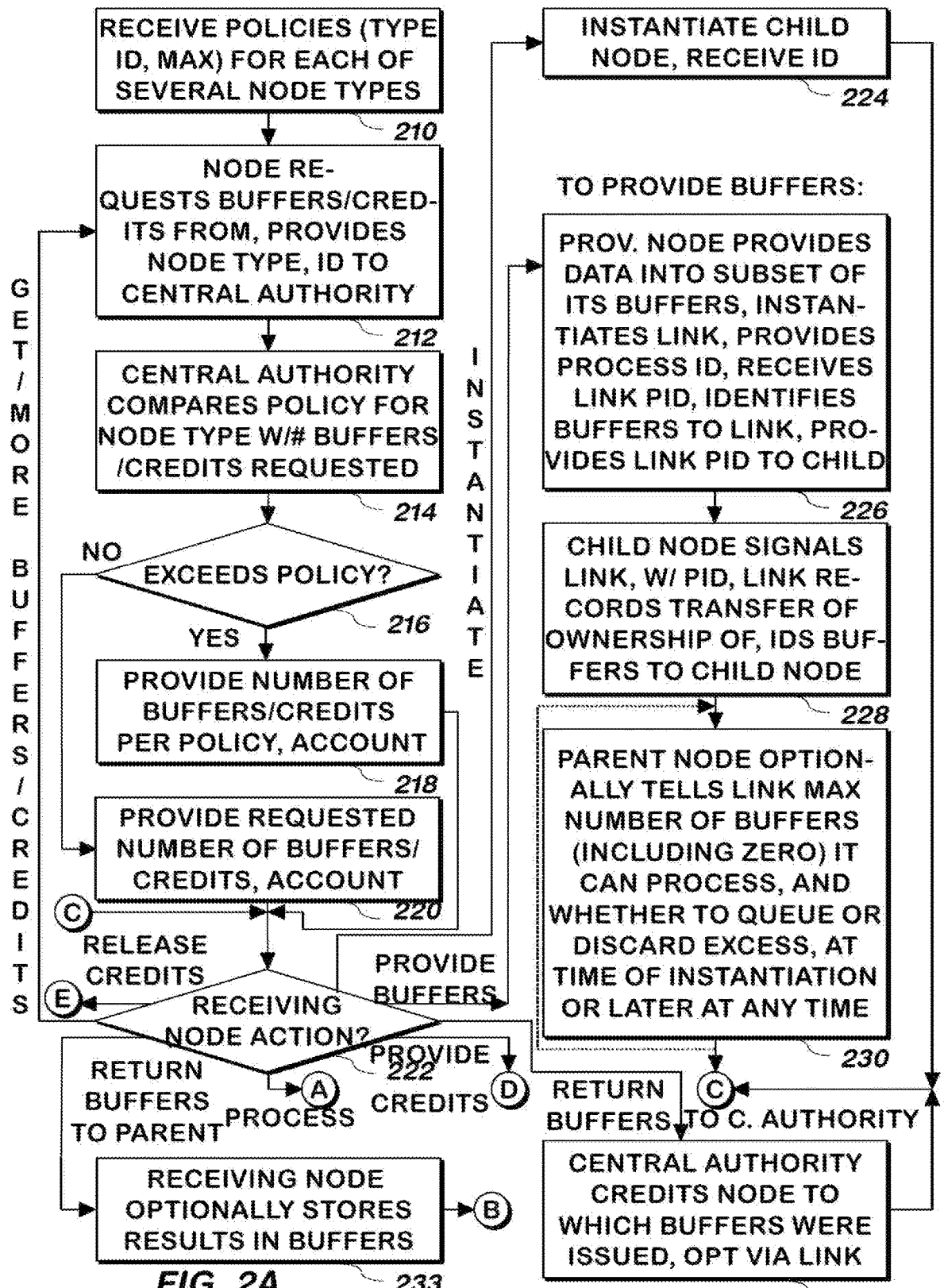

FIG. 2, consisting of FIGS. 2A, 2B, 2C and 2D is a flowchart illustrating a method of managing resources in a computer system according to one embodiment of the present invention. Referring now to FIG. 2A, policies for each of several node types are received 210. The policies include, for each of several types, a type identifier and a maximum number of buffers that may be issued to a node of that type. In one embodiment, a buffer is a portion of a resource, such as an area of memory, such as RAM.

Obtain Buffers or Credits from Central Authority

Each software thread in the computer system is has a parent node, which is a process that controls or initiates the thread, one or more parent nodes is automatically instantiated upon system startup or at another time, and some or all of the parent nodes perform the functions described herein. A parent node requests 212 one or buffers from a central authority by providing a unique identifier issued upon instantiation of the node or otherwise, its type, and the number of buffers it is requesting. The type may be built into the node. The number of buffers it requests may be a fixed number or a number that depends on parameters it receives and the like.

In one embodiment, a node may also or instead request buffer credits. Such credits are promises or conditional promises to issue a buffer provided the number of buffers outstanding does not exceed the policy for the parent node that requested the credits. A credit is not considered to be a buffer outstanding until the credit is redeemed for a buffer, in one embodiment. A credit may be passed to a child node and redeemed by that child node, as described in more detail below. The condition on a promise may be that the resource (such as memory) is available at the time the credit is redeemed for the buffer.

The central authority is a separately running independent (of the nodes) process that manages the issuing of buffers and maintains a count of the number of buffers that are issued to any node. The central authority checks 214 the number of buffers issued and outstanding to the node, or its child nodes on its behalf, and adds the number of buffers being requested to the maximum number of buffers available to the type of node it provided, as indicated by the policy for that node type.

If the result does not exceed the maximum number of buffers stated by the policy of the type of the node received 216, the central authority issues 220 to the requesting parent node the number of buffers it requested, by providing buffer identifiers, which may indicate an address or may indicate an offset from a starting memory location, when multiplied by the size of the buffer, which may be fixed and known to each node, or the size of each buffer and/or starting memory location may be provided by the central authority to the requesting node. The method continues at step 222.

If the result of the addition above exceeds the maximum number of buffers stated by the policy of the type of the node received 216, the central authority issues 218 to the requesting parent node a number of buffers so that the number outstanding is equal to the maximum for the type of node that requested the buffers. The method continues at step 222.

The central authority accounts for buffers it provides to a node. As buffers are issued to a node, the number of buffers accounted as being issued to the node is increased as part of step 218 or 220.

In one embodiment, the central authority will issue an unlimited number of credits without regard to the policy. Credits that are redeemed for buffers are ultimately charged against the maximum outstanding buffers of the node that requested them. In another embodiment, the maximum number of credits is a part of each policy and the central authority enforces the maximum outstanding credits. The maximum may be specified as an absolute number or as a function of the difference between the outstanding buffers and the maximum (e.g. "a node of this type may be issued outstanding credits that exceed more than twice the difference between the number of buffers outstanding and the maximum number of buffers for that type").

In one embodiment, buffers may be requested from the central authority by a parent node or any of its child nodes. Aa described in more detail below, buffers may be returned to the central authority or released to a node that is a parent of the node releasing them. In one embodiment, buffers requested directly from the central authority by a node are not releasable to a parent of the node that requested them from the central authority. In another embodiment, such buffers are releasable if the receiving node either identifies them or identifies the number of such buffers it received to its link as described below, and the receiving node may provide such information to its link as part of steps 218 or 220, and in such case, the link records them as being owned by the node that requested them, or adds the number of such buffers to the number of buffers owned by the node.

A node that received the credits or buffers (in this first instance, the parent node of the thread) may perform any of several actions with the buffers or credits, optionally performing other conventional processing activities in between.

Instantiate Child Node.

At any time, a node may instantiate a child node. If the node wishes to instantiate a child node, the child not is instantiated, optionally using an operating system, and an identifier that can be used to communicate with the child node is received 224. The method continues at step 222. In one embodiment, a node may instantiate any number of child nodes. As used herein, a node is a thread or a process or subroutine or the like, and a child node is a thread, process or subroutine that is instantiated by, and may be controlled by, it's parent node. In one embodiment, a child node may act as a parent to one or more other nodes, which makes the node both a parent node (or a node) as well as a child node.

In one embodiment, it is not necessary for a node to receive buffers or credits before the node may instantiate one or more child nodes. For example, upon system startup or other instantiation of the node, a node may first instantiate child nodes and then start requesting credits or buffers.

Provide Buffers

If the receiving node wishes to provides buffers to a child node, 222, the providing node optionally provides data into some or all of the buffers it will provide, and instantiates a link, if not already instantiated between the parent and the child. If a link is instantiated, that link is used. A link is a communication process that operates independently of the providing node and the receiving node, in one embodiment. The providing node receives an identifier of the link from an operating system, and provides to the link an identifier of itself and the buffers it is providing. The providing node provides the identifier of the link to the child node or provides the identifier of the child node to the link. All of the above functions are performed as part of step 226. Communication between the link and the nodes, and among nodes, may be made via the operating system. In one embodiment, identifiers of nodes or links may be a 64 bit address or offset of the node or link, a process identifier, or other conventional identifier.

The child node signals the link, optionally with its identifier (or the link contacts the child node) and the link internally records the transfer of ownership, or number, of the buffers to the child node, and identifies them to the child node 228. The child node may then use the buffers, and any data stored therein, and may store data into some or all of the buffers. The method may continue at step 230 or 222.

The parent may provide data or instructions in the buffer or buffers provided. The instructions may direct the child node what to do with the buffers. In one embodiment, the instructions may be provided as one or more parameters that are provided to the link by the parent, and by the link to the child together with the buffer identifiers.

At any time after it instantiates a link, the parent node may instruct the link regarding how to provide to the parent released buffers to control the flow of buffers released to the parent. In one embodiment, there are two flow control parameters: the maximum number of buffers that should be released at one time, and what to do with the excess: either queue them or discard them. The node that created the link provides such information to the link 230, which receives it and stores it. The method continues at step 222.

It is noted that the receiving node at step 222 may be the parent node, or a child node that has received buffers as described above. When a parent provides buffers to a child, either or both of the parent and the child can perform any action of step 222.

Return Buffers to Central Authority.

At any time, a node may return to the central authority, buffers it has received, either from the central authority, or from another node such as a parent node. If the receiving node action is to return the buffers to the central authority 222, the node provides the identifiers of the buffers it wishes to return either to the central authority, or to the link from which they were received (which provides them to the central authority) and the central authority credits the returned buffers to the node to which the buffers were issued by the central authority, so that such node is further from the maximum number of nodes it can receive under the policy for the type of node. If the buffers were returned via the link, the link also updates its inventory of buffers or number of buffers held by the node returning them, and the link and/or central authority may also check the buffers or number of buffers to ensure only buffers issued to the node or no more than the number of buffers held by or issued to the node, are returned, generating an error to the node, or to the node via the link, if other buffers or more buffers are attempted to be returned.

Provide Credits to Another Node/Redeem Credits.

If the node that received the credits wishes to provide them to another node such as a child node of the receiving node 222, the method continues at step 270 of FIG. 2D. Providing credits for buffers (or providing buffers) may be done as part of a request to the child node to perform a function using the buffers. In one embodiment, the function is implied by providing the buffers and in another embodiment, the buffers may be provided with a command that indicates the function the child node should perform with them.

At step 270, the parent node instantiates a link (if one is not already instantiated: if a link from the parent to the child is already instantiated, the instantiated link is used) and provides the link its process identifier and identifiers of the credits it has obtained as described above and herein and the link records the identifiers of the credits or the number of credits as being owned by the child node. The parent node receives a process identifier of the link. The parent optionally instantiates the child node if the child node is not already operating, and provides to the child node the process identifier of the link to which it provided the credits.

The child node signals the link to provide credits and the link provides identifiers of the credits it received from the receiving node 272.

The parent may provide data or instructions with the credit identifiers provided. The instructions may direct the child node what to do with the buffers obtained from the redeemed credits. In one embodiment, the instructions may be provided as one or more parameters that are provided to the link by the parent, and by the link to the child, together with the credit identifiers.

In one embodiment, following step 272 or at any other time after or during link instantiation, the parent node may inform the link of the maximum number of buffers (which may be from redeemed buffers) that may be released to it at any one time and the action that should be taken with any buffers that exceed that maximum as described above and herein 274. Such a maximum and action would be enforced if the buffers that were obtained by redeeming credits were released to the parent node that provided them. The method may continue at step 222 after step 272 or 274.

At any time after the credit identifiers have been received, the node that received the credit identifiers can provide them to the central authority 276 or the link 276. If provided to the link, the link checks to ensure that they were received and not redeemed, or that the node from which the link received them has at least that many, removes from its ownership records or subtracts them from the credits the link believes the node owns, and provides them to the central authority. When the central authority receives the credit identifiers, it checks them to ensure they were issued and not redeemed, and that if it redeems them, the total number of buffers for the node that originally requested the credits from the central authority is not exceeded according to the policy for that type of node. If the credit is not valid (for example, because it has been redeemed) or the total number of buffers outstanding for the node that requested the credits exceeds the policy of the type of that node 278, the central authority sends an error to the child node (optionally via the link from which they were optionally received) and the method continues at step 222. Otherwise 278, the central authority provides the buffer identifiers to the child, optionally via the link from which the buffers were received (in which case, the link records them or adds the number of them to the number of buffers it believes are owned by the node) and the central authority records them against the node that requested the credits redeemed to obtain them, invalidates the credits, and the child node that redeemed the credits may use them, provide them to one of its child nodes or return or release them as described herein 282. If the link was not used to redeem the credits, the child node that redeemed the credits provides to the link the buffer identifiers or number of the buffers it received, which records them as being owned by the child node 284, and the method continues at step 222.

In one embodiment, the link will also maintain either an inventory of or the number of credits held by the node that received them, and so the node redeeming credits may provide the identifiers of the credits redeemed to the link with the identifiers of the buffers (or the link subtracts one credit from the number of credits held by that node for each buffer or number of buffers reported by the child and the link updates the credits or the number of credits as no longer being available to the node. The method continues at step 222.

Process Data.

If the receiving node wishes to process data using buffers 222, the method continues at step 292 of FIG. 2B. At step 292, the receiving node processes data using the buffers or processes the data passed in the buffers, and then identifies its next action. The method continues at step 222.

Return Credits.

At any time after a node has received credits, it may return any unredeemed credits to the parent node that provided them. If a node's action is to return the credits 222, the node that has them identifies them to the link from which they were received 288, and the link provides the identifiers of the credits it receives to the parent node that provided them 290. The method continues at step 222.

In one embodiment, the parent node that received credits from the central authority or any other node that received them may provide their identifiers to the central authority with an indication that the credits are being returned. The central authority then invalidates the credits and does not redeem them for buffers. In another embodiment, the parent or other node simply doesn't use or provide credits it has no use for and doesn't anticipate using and does not return them.

Release Buffers to Parent Node.

If the receiving node's action is to release to its parent node the buffers it received as described above 222, the receiving node may optionally place data into some or all of the buffers and signal the link from which the buffers were received with the identifiers of the buffers 233. The method continues at step 234 of FIG. 2B.

It is noted that there may be any number of descendants of a parent node of a thread, with multiple generations, and buffers may be passed down or released up to any number of generations, one generation at a time in one embodiment.

In one embodiment, buffers received from the central authority may only be returned to the central authority, and not released to a parent node. In one embodiment, buffers received in exchange for credits from a parent node and buffers received from the parent node may be released to that parent node. In still another embodiment, any buffer of a child may be released to a parent node, even those requested and received from the central authority, not in exchange for credits.

At step 234, if the node that received and wishes to return or release the buffers is done with some of the buffers it received from its parent, the node that had received them and is returning or releasing them identifies them to the link from which they were received, and the link checks ownership of the buffers to ensure that the node returning or releasing them either owns the buffers being returned or released or is not returning or releasing more buffers than it owns 238 and the method continues at step 240.

If the node is done with all of the buffers it received from its parent or from the parent to which it is releasing the buffers 234, along with any buffers being released, a special buffer is released by the node releasing the buffers providing it and any other buffers to the link from which the other buffers were received. A special buffer may be a real or virtual buffer with a special identifier (which may not correspond to any storage at all), or it may be a real buffer with a parameter or flag set that indicates it is a special buffer. The parameter may be a part of the buffer or a part of the identifier of the buffer.

In one embodiment, a special buffer may only be released by a child node to a parent node with at least one other buffer that was received from the parent node. The special buffer indicates to the parent node that the child node is done with the processing for which the buffer or buffers were provided. In another embodiment, no such requirement is imposed.

The link checks ownership of the buffers or number of buffers for all buffers or all but the special buffer, as described above, as part of step 238. The method continues at step 240.

At step 240, if the node from which the buffers were provided owns all of the buffers (in one embodiment, all of the buffers excludes the special buffer), either as indicated by their identifiers, or by the number of buffers registered as being owned by the node meeting or exceeding the number of buffers being returned, the method continues at step 246 (by the link) and step 222 by the node returning the buffers, and otherwise 240, the link indicates an error to the node that provided the buffers 242 and the method continues at step 222. Step 246 and 242 may follow step 240, so that buffers owned are released, or buffers owned are released up to the number owned.

At step 246, if the number of buffers released exceeds any limit provided by the parent node, the method continues at step 248, and otherwise 246, the method continues at step 262.

At step 248, the link identifies the response to the number of buffers exceeding the limits set by the parent node. It the response was to discard the excess 250, if the special buffer was released as described above 252, the link provides the special buffer to the parent node 252, and the link optionally identifies to the parent node the buffers being released and releases the remainder to the central authority 252 and the method continues at step 222. The special buffer is released as the last buffer. In the event that the maximum number of buffers allowed to be released to the parent is zero, the link returns only the special buffer, and in another embodiment, even the special buffer is not released in such event. In one embodiment, the special buffer is counted as a buffer returned, and in another embodiment, it is not counted against the maximum. If the special buffer was not released 252, the method continues at step 262.

If the response to the number of buffers exceeding the limit is to queue the remaining buffers 250, the link identifies the buffers within the limits by providing their identifiers to the parent node from which the buffers were received, and may optionally indicates to such parent node the number of buffers queued 258. The identifier of any special buffer will be provided as the last buffer in the last set of buffer identifiers in one embodiment. if the special buffer identifier was received 260, the parent takes the action it takes following such receipt 262 and the method continues at step 222. Actions may include processing data received, instantiating a new node and providing data in the buffers received to such new node, or other actions described herein.

If more buffers were queued 264, at any time, the parent node may instruct the link to provide additional buffers at any time 266, and the method continues at step 258. If there are no buffers queued, the method continues at step 222.

If the number of buffers does not exceed any limits specified, for example, because there were no limits specified, the method continues at step 262, in which case all the buffers will be identified to the parent and none of the buffers will be queued or identified as being additional as part of step 262.

Return Buffers to Central Authority.

If the node wishes to return buffers to the central authority 222, the node provides the buffer identifiers to the central authority, optionally via the link to its parent, and the central authority credits the buffers to the node that requested them or the credits redeemed for them 232. If returned via the link, the link checks that the node owns the buffers or owns a number of buffers at least as large as the number of nodes being returned, and then deducts the buffers or number of buffers from the buffers owned by the node as part of step 232. The method continues at step 222.

System.

Figure 3:
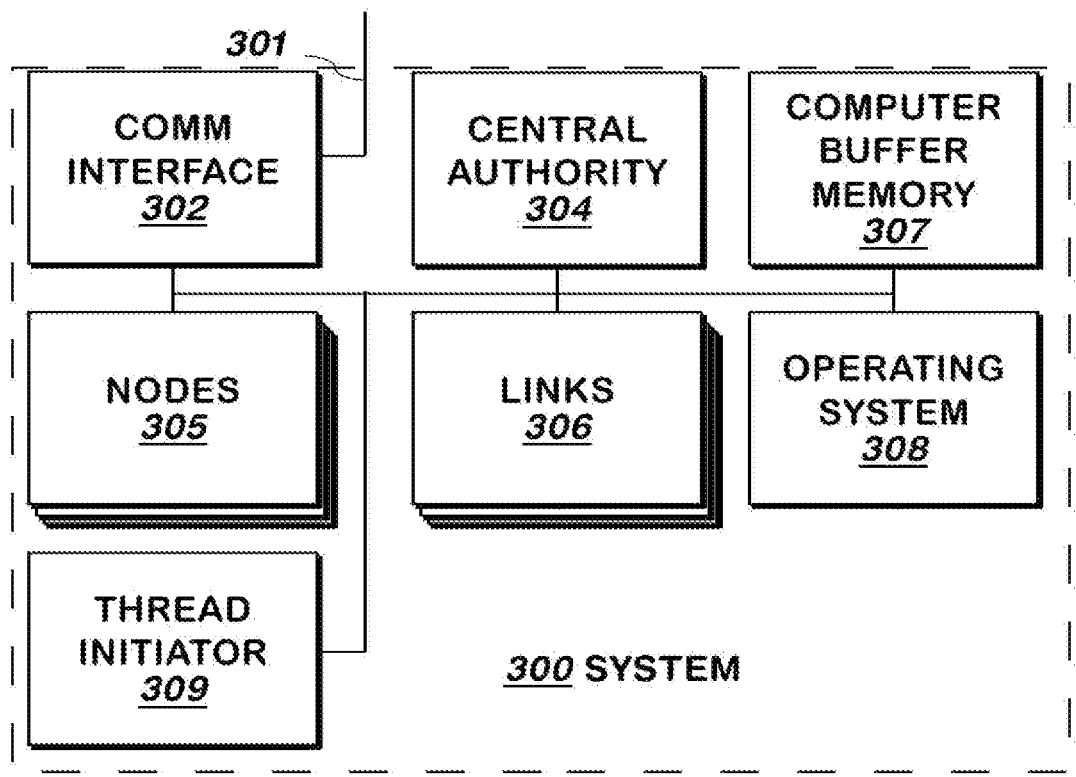
FIG. 3 is a block schematic diagram of a system for managing buffers and facilitating communication between processes according to one embodiment of the present invention.

Referring now to FIG. 3, a system 300 for managing buffers is shown according to one embodiment of the present invention. System 300 includes a communication interface 302, central authority 304, two or more nodes 305 and one or more links 306. System 300 additionally includes computer buffer memory 307, which may include conventional random access memory, operating system 307 which may include any conventional operating system, and thread initiator 309, which, upon system startup, initiates one or more parent nodes, which is one of nodes 305.

Communication interface 302 includes a conventional TCP/IP-compatible communication interface running suitable communication protocols, such as Ethernet and TCP/IP. Communication interface 302 has input/output 301 that may be coupled to an Ethernet network, the networks that make up the Internet, or both of these. Unless otherwise specified, all communication into or out of system 300 is made via input/output 301 of communication interface 302, which forwards communications as described herein.

The components of FIG. 3 may communicate among one another using conventional mechanisms such as bus interfaces connected to busses, communication interfaces coupled to networks, shared memory, operating system interprocess communication facilities, or the like.

Figure 4:
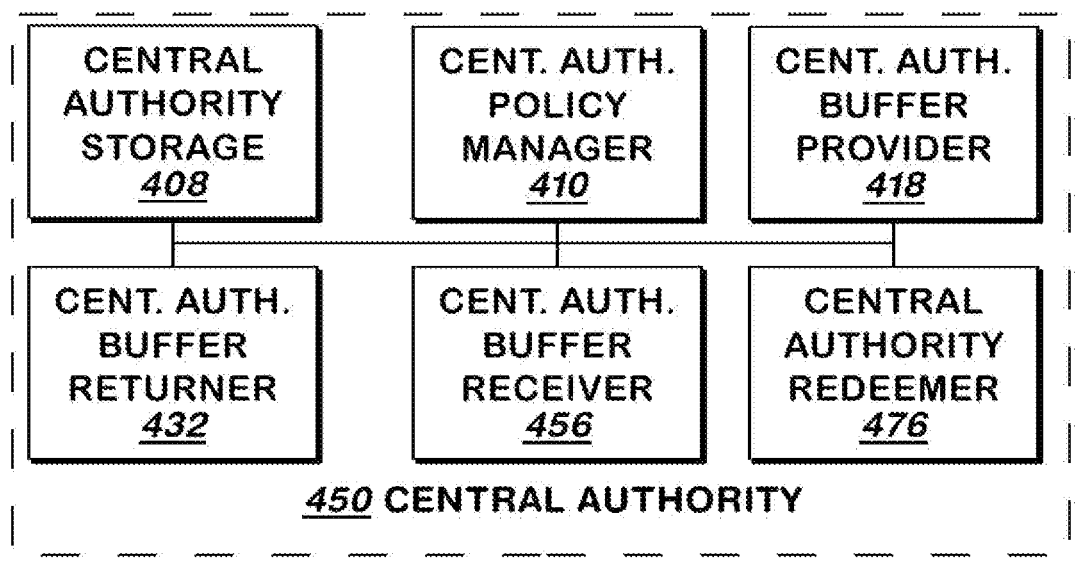
FIG. 4 is a block schematic diagram illustrating a central authority of FIG. 3 in more detail according to one embodiment of the present invention.
Figure 5:
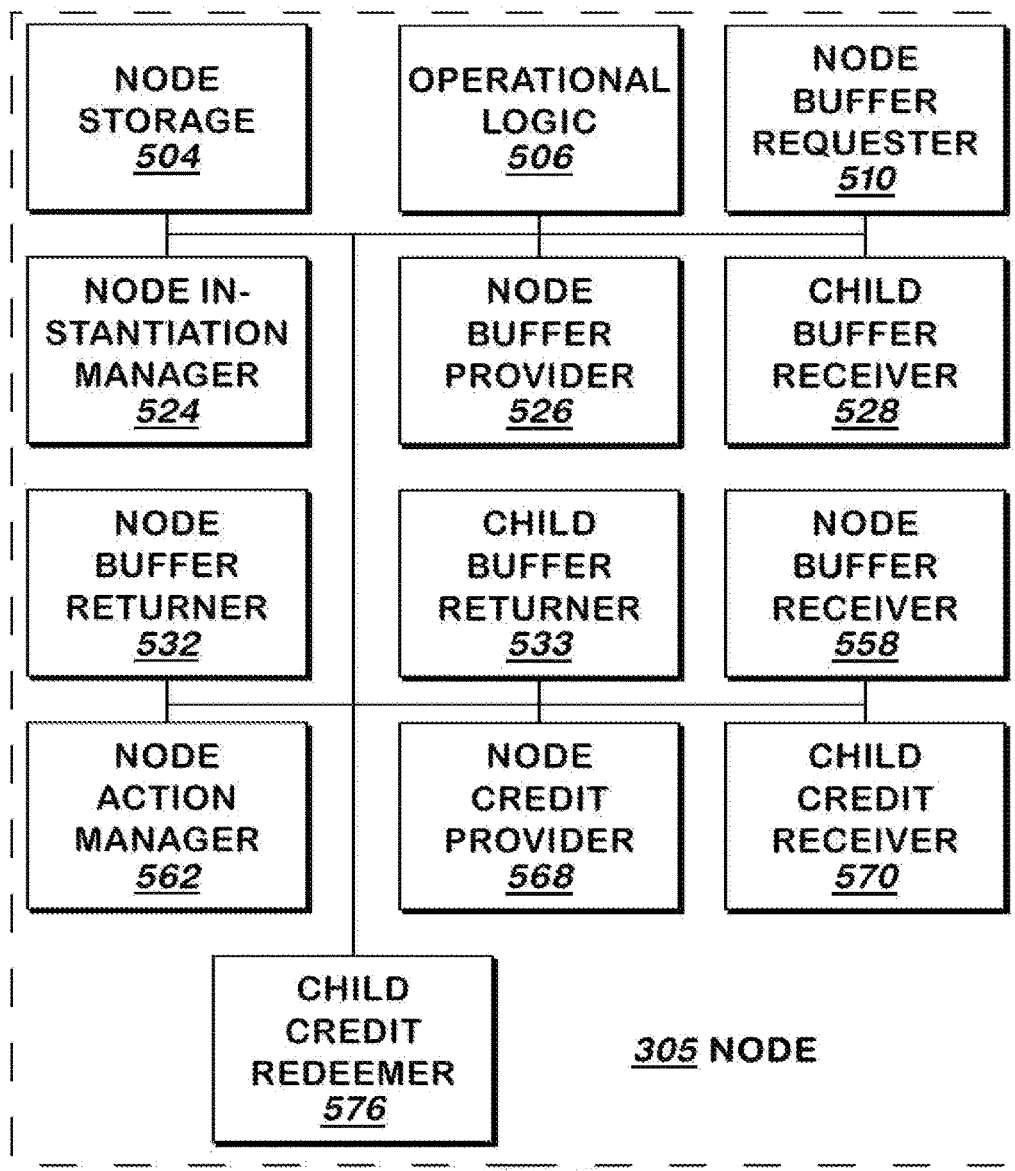
FIG. 5 is a block schematic diagram illustrating a representative node of FIG. 3 in more detail according to one embodiment of the present invention.
Figure 6:
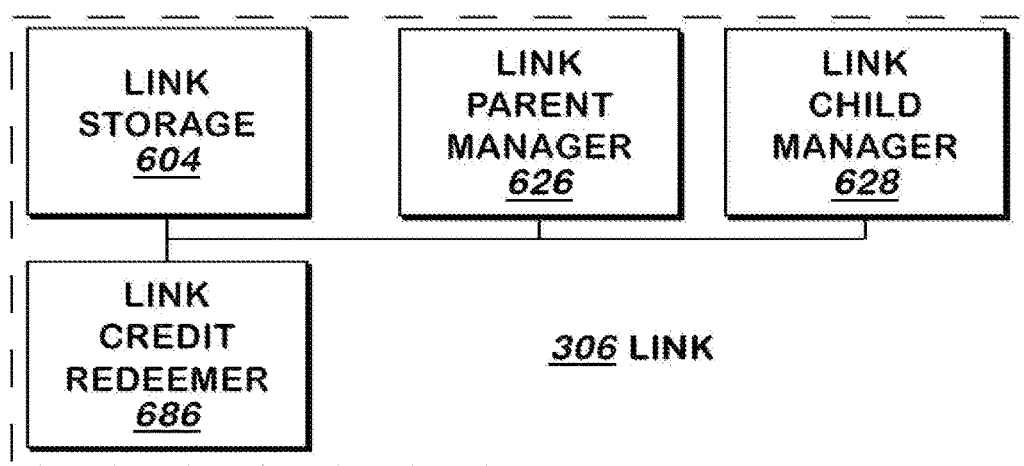
FIG. 6 is a block schematic diagram illustrating a representative link of FIG. 3 in more detail according to one embodiment of the present invention.

Central authority 304 is shown in more detail in FIG. 4. A representative one of nodes 305 is shown in more detail in FIG. 5. A representative link 306 is shown in more detail in FIG. 6. Each operates as described above and herein. The components of each one that are labeled as storage may include conventional random access memory, though other types of storage may be used. All other components of FIGS. 4, 5 and 6 may include conventional hardware processor coupled to a memory system that is programmed or wired to operate as described herein. The only nonce word used in this application is "means". All other system components are structural. Input/outputs are shown in each component, though individual inputs and outputs may be used.

Central authority policy manager 410 receives policies, such as a type ID and a maximum number of buffers for each of several node types, and stores them into central authority storage 408 for use as described herein.

Node buffer/credit requester 510 requests one or more buffers and/or credits from central authority buffer provider 418 by including the number of buffers, credits or both, it is requesting, its node type and an identifier that uniquely identifies that node as part of the request. The identifier may be implied and not explicitly provided by node buffer/credit requester 510, and the type may be implied by the node identifier and also not provided, for example, if a set of node identifiers and types are maintained in central authority storage 408, for example, by thread initiator 309 providing a list of identifiers and types for each parent node of the threads it initiates to central authority policy manager 410, which stores them in central authority storage 408 for use in determining the maximum number of buffers that may be outstanding to a given node. Node buffer/credit requester 510 may request such buffers or credits at any time. Central authority buffer provider 418 counts the number of buffers issued on behalf of that node, adds the number of buffers issued on behalf of that node (including redeemed credits) to the number of buffers requested, and compares the total to the maximum number of buffers for that type. The number of buffers issued to a node may be maintained by the elements of central authority 304 that affect the number as described herein so that counts need not be performed. If the total number of buffers is less than or equal to the maximum for the type, central authority buffer provider 418 stores the node type and identifier, and the total number of buffers in central authority storage 408, stores identifiers of any buffers and credits issued associated with the identifier of the node and type and issues the requested number of buffers.

In one embodiment, to issue a buffer, a buffer identifier is associated with the node identifier on a list of identifiers of all buffers that can be assigned that resides in central authority storage 408 from among any such buffers not associated with a node identifier, and the buffer identifier is provided by central authority policy manager 410 to node buffer/credit requester 512, which stores it into node storage 504. The buffer identifier corresponds to a portion of computer buffer memory 307, such as a portion identified by multiplying the buffer identifier by a buffer size and adding it to an offset to identify the start of the buffer of that size. Any number of buffers may be requested at a time and all of the buffer identifiers are processed as described above at one time. Buffers with no associated node identifiers are considered to be marked as available, and only such available buffers are issued to a child node.

To return one or more buffers to the central authority, the node that requested them provides the number of buffers to be returned to node buffer returner 532, which identifies buffers up to the requested amount that are not indicated as having been provided to a child node in node storage 504. If the number requested exceeds those available, node buffer returner returns an error and identifies the number of buffers available to be returned so that suitable corrective measures may be taken. In one embodiment, node buffer returner 532 may be directed by the node to return all available buffers or all buffers. In the case of all buffers, node buffer returner 532 returns an error if not all of the buffers are available to be returned.

Node buffer returner 532 provides the identifiers of the buffers being returned to central authority buffer returner 432, which removes the node identifier from the buffer identifiers in central authority storage 408, thereby making them available for reuse. In one embodiment, central authority buffer returner 432 checks to see that the buffers were issued to the node returning them, and provides identifiers of the one or more buffers to a node that returns them to which the buffers were not checked out, and does not remove the node identifier from such buffer identifiers in central authority storage 408. The node identifier may be provided with the buffer identifiers or may be implied based on the manner in which the buffer identifiers are provided. Node buffer returner 532 removes from node storage 504 the buffer identifiers of the buffers it returned.

To issue credits, the same procedure may be used in response to a request to issue credits, using a list of available credits in central authority storage 408, except that the credit identifiers do not correspond to physical memory, but operate as a contingent claim for a buffer identifier to be issued at a later time.

In one embodiment, credit identifiers are issued without regard for available buffers, and in another embodiment, credit identifiers may be limited by the number of buffers not assigned to a node, such as by central authority buffer provider 418 limiting the number of credits assigned to all nodes to be not more than the number of unassigned buffers times a multiplier, such as 5 or 10.

If the total number of buffers exceeds the maximum for the type, central authority buffer provider 418 provides identifiers of a number of buffers equal to the difference between the number of buffers assigned on behalf of the requesting node and the maximum number of buffers for the type of the node, and indicates an error, which may include the number of buffers provided, or the number of buffers not provided.

As described herein, the parent node 305 requests buffers and credits immediately upon creation of that parent node 305, but other embodiments may have a parent node request buffers and credits at a later time.

Any number of parent nodes may be instantiated upon system startup or at other times by thread initiator 309 and a node 305 may spawn additional nodes 305 that are children of the parent node 305 with any number of descendants. In one embodiment, a child node 305 may only receive buffers from its parent 305 and in another embodiment, a child node 305 may receive buffers from its parent 305, may request buffers for itself 305, or any of these. Thread initiator 309 instantiates any number of parent nodes, via operating system 308, for example, on system startup, or in response to a request. In one embodiment, the request is a conventional database query, and thread initiator 309 parses the query and initiates threads based upon the content of the query, with each thread performing a functional component required or desired to perform the query, the number and type of threads in existence and the number and type of work being performed for any requests outstanding.

If the node 305 wishes to instantiate another node 305, such as a child node 305, node instantiation manager 524 instantiates the node via operating system 308 and receives an identifier of the node 305 from operating system 308 that it may use to communicate with, or reference, the node. Each node 305 may consist of software, operating on a processor, that performs a function, and thus, a node 305 may instantiate any number of nodes 305 it may use to perform the functions it requires. Each node 305 may instantiate any number of other nodes 305 at any time. The node 305 that instantiates the node 305 is considered to be the parent node of the instantiated node 305. A child node 305 can be the parent 305 of another node 305, and perform actions described herein as both a child 305 and a parent 305.

At any time, a parent node 305 may provide buffers to a child node 305. To provide one or more buffers to a child node 305, node buffer provider 526 selects one or more buffers from those stored in node storage 504 for that node, instantiates a link 306 via operating system 308, provides an identifier of the node if not already provided to that link, and provides the identifiers of the one or more buffers to link parent manager 626, which stores them and any parent node identifier into link storage 604. Node buffer provider 526 additionally marks the buffer identifiers in node storage 504 of the providing node as being in use and issued to the node, for example by marking them with an identifier of the child node in node storage 504. The buffer may have been loaded with data by the parent node 305 before it is provided as described herein and above.

In one embodiment, a link 306 is a process that runs on a computer system that operates as described herein. Operating system 308 provides node buffer provider 526 an identifier that can be used to communicate with the link 306. Node buffer provider 526 stores the identifier of the link 306 into node storage 504, associated with the identifier of the child node with which the link 306 will be used to communicate and other information about the node and provides the identifier to the child buffer receiver 528 in the child node. The link identifier may be provided to the child node via a shared memory location, via operating system 308 using any conventional interprocess communication method, or using any other conventional method. The child node, being a node, will have its own node storage 504, and child buffer receiver 528 stores the link identifier into the node storage 504 of the child node 305.

Child buffer receiver 528 uses the link identifier to request some or all of the buffers from link child manager 628, which retrieves their identifiers and provides them to child buffer receiver 528 in response. The number of buffers desired may be provided in the request or all buffers may be provided by default. Child buffer receiver 528 stores the identifiers of the buffers it receives into a list of buffers it has in node storage 504 of the child node. Any number of such requests may be made and the requests are fulfilled with some or all of the buffer identifiers not already provided.

At any time, node buffer provider 526 may indicate to link parent manager 626 the number of buffers that can be returned at any one time as described above, and whether to queue or to discard any excess buffers being returned. Link parent manager 626 stores the number and such other instruction into link storage 604, for use as described herein and below.

At any time, a child node that received buffers from a parent may return them, optionally with data stored therein to be returned to the parent for further processing or simply because the receiving node no longer needs the buffers. To return buffers, child buffer returner 533 optionally stores data in one or more of the buffers. In one embodiment, certain nodes may perform a specific function and the data returned via the buffers may be the results of the functions performed using the data received, optionally using some or all of the buffers being returned.

Child buffer returner 533 locates the link identifier in node storage 504 and uses it to provide the identifiers of the buffers being returned to link child manager 628 with an instruction to return the buffers to the parent node 305 of the child node 305 returning the buffers. If all of the buffers held by the child node 305 are being returned, the child node 305 also indicates that it is returning the special buffer by returning its identifier.

Link child manager 628 checks link storage 604 to ensure all of the buffers being returned, except for the special buffer, are owned by the child node returning them, and if not, identifies the buffers not being owned to child buffer returner 533, which may take suitable corrective measures and repeat the return of the buffers not so identified.

If all of the buffers are owned by the child node 305, link child manager 628 so indicates to child buffer returner 533, which removes the buffer identifiers from the list of buffers it is holding from node storage 504 of the child node.

Link child manager 628 marks in link storage 604 the buffer identifiers matching the ones received and signals link parent manager 626.

When it receives such signal, link parent manager 626 identifies if there are any limits stored in link storage 604, and if so, and if the number of buffers being returned exceeds that limit, and the action to be taken if the limits are exceeded.

If the number of buffers does not exceed the limit or there is no limit, link parent manager 626 identifies the buffers being returned to node buffer receiver 558, which marks the buffer identifiers in node storage 504 as available (e.g. by removing the identifiers of the child node to which they had been provided) and checks the buffer identifiers for the identifier of the special buffer, and if such identifier was received, signals node action manager 562, which performs any special action that it takes upon such receipt of the special buffer identifier, and does not perform such action otherwise. The special action may include killing the child node, instantiating another child node and/or providing some or all of the returned buffers to the newly instantiated or different node for further processing, returning some or all of the buffers to a parent node as described herein or a separate entity that provided a request for the actions taken by the thread via thread initiator 309, or performing additional processing on some or all of the returned buffers, which may contain data. Node action manager 562 may perform any of these actions and may process data when buffers are received, having been notified by child buffer receiver 528, when buffers containing data to process or buffers to use, are received.

If the number of buffers exceeds the limit, if the action is to discard the buffers that exceed the limit, link parent manager 626 provides to node buffer receiver 558 the first set of buffer identifiers identified to link child manager 628 by the child node, up to the limit. If the special buffer identifier was included in the list of buffer identifiers received, link parent manager 626 either ensures its identifier is provided as one of the buffer identifiers it provides, or provides it in addition to the first set of buffer identifiers. Node buffer receiver 558 marks the buffer identifiers in node storage 504 as available, checks the buffer identifiers for the identifier of the special buffer, and if such identifier was received, signals node action manager 562, which performs any special action as described above. In one embodiment, link parent manager 626 provides the identifiers of the remaining buffer identifiers to central authority buffer receiver 456, which marks in central authority storage 408 the buffer identifiers as available. In one embodiment, node buffer receiver 558 also removes from node storage 504 the other buffers provided to the node 305. In such embodiment, link parent manager 626 identifies the child node from which the special buffer identifier was received. Buffers provided to a child node 305 are marked with the identifier of such child node in node storage 504 by node buffer provider 526.

If the number of buffers exceeds the limit and the action specified is to queue the buffers that exceed the limit, link parent manager 626 checks the buffer identifiers in link storage 604 for the identifier of the special buffer and if it locates it, moves it to the end of the list in one embodiment, and provides the number of buffer identifiers up to the limit to node buffer receiver 558, which signals node action manager 562 with the identifiers of the buffers it received. Node action manager 562 then optionally processes the buffers and signals node buffer receiver 558. Link parent manager 626 removes from link storage 604 the buffer identifiers it provides.

When signaled by node action manager 562, node buffer receiver 558 signals link parent manager 626, which repeats the process of providing buffer identifiers up to the limit and retaining the rest. When there are no more buffers when link parent manager 626 is signaled, link parent manager 626 signals node buffer receiver 558. When so signaled, or if the special buffer identifier is received, node buffer receiver 558 so indicates to node action manager 562, which takes any of the same actions described herein when the special buffer identifier is received.

In one embodiment, the buffer identifiers or the first set of buffer identifiers are not pushed to the node. Instead, the node is notified of their availability, and may request them as with queued buffer identifiers as described above.

Operational logic 506 in each node 305 determines the actions of that node. Operational logic 506 may perform specialized database functions, with various nodes providing each of several functions to carry out conventional database requests, and the operational logic in each node uses the present invention in the performance of its duties, operational logic in nodes may perform other types of duties. Operational logic 506 is sometimes described herein as being "the node".

If the node 305 wishes to provide credits to a node 305 such as a child node 305, node credit provider 568 selects one or more credit identifiers from those stored in node storage 504 for the providing node 305, instantiates a link 306 via operating system 308, provides an identifier of the node 305 if not already provided to that link 306, and provides the identifiers of the one or more credits to link parent manager 626, which stores them and any parent node identifier into link storage 604. Node credit provider 568 then removes the credit identifier or identifiers from its (the providing node's) node storage 504. In one embodiment, if a link 306 to the child node 305 has already been instantiated, the link to that node is used for providing subsequent buffers or credits instead of instantiating a new link. Any number of buffers or credits may be provided at any time.

Node credit provider 568 stores the identifier of the link 306 into node storage 504, associated with the identifier of the node with which the link 306 will be used to communicate and provides the link identifier to the child credit receiver 570 in the child node 305. The link identifier may be provided to the child node 305 via a shared memory location, via operating system 308 using any conventional interprocess communication method, or using any other conventional method. The child node 305, being a node 305, will have its own node storage 504, and child buffer receiver 570 stores the link identifier into the node storage 504 of the child node 305.

When a child node 305 requires buffers it doesn't already have, it may redeem credits for buffers. To redeem credits for buffers, it signals child credit redeemer 576, which uses the link identifier to request some or all of the credit identifiers from link child manager 628, which retrieves their identifiers and provides them to child credit redeemer 576 in response and removes them from link storage 604. The number of credits desired by the node may be provided in the request or all credits may be provided by default. (In one embodiment, child credit redeemer 576 is notified by link child manager 628 each time credits are provided to the link, and child credit redeemer 576 receives the identifiers of the credits with the notification. Child credit redeemer 576 stores the credit identifiers into node storage 504, which child credit redeemer 576 retrieves when it desires to redeem credits for buffers.) Child credit redeemer 576 then provides the credit identifiers to central authority redeemer 476, which checks node storage 408 to make sure the number of buffers outstanding to the node that requested the credits from the central authority, plus the number of credits being redeemed, is less than or equal to the maximum number of buffers for that type of node. If not, central authority redeemer 476 indicates to child credit redeemer 576, the number of buffers that may be redeemed so as not to exceed the maximum, and child credit redeemer 576 may resubmit the request at or under this limit. If credits are stored in the link, credits not redeemed are returned to link child manager 628, which stores them in link storage 604.

It is noted that a node 305 will use its own node storage 504 as described herein.

If the number of buffers unreturned to the central authority 304 that were issued to the node that requested the credits from central authority, plus the number of credits being redeemed is less than or equal to the maximum number of buffers for the type of node that requested the credits from the central authority, central authority redeemer 476 checks the credits to ensure they are not redeemed, and if not, marks in central authority storage 408 the credits as redeemed, identifies in central authority storage 408 buffer identifiers that are available, marks them as issued to the node that had requested the credits from the central authority, and provides an equal number of buffer identifiers as credits redeemed to child credit redeemer 576, which stores the buffer identifiers into node storage 504 for use as working storage for the node. The information used to identify the number of unreturned buffers issued and the maximum is stored in central authority storage 408. Any redeemed credits attempted to be redeemed again will generate an error from central authority redeemer 476 to child credit redeemer 576 instead of the buffer corresponding to that credit or an error for all the credits, and the identifier of the credit or credits already redeemed. Child credit redeemer 576 can then resubmit the list of credit identifiers without the redeemed credit identifier or identifiers, optionally along with a different credit or credits.

Child credit redeemer 576 provides the buffer identifiers it receives to link child manager 628 of the link from which the credit identifiers were received, and link child manager 628 records them in link storage 604 as being held by the child node for which it was created. Child credit redeemer 576 then stores the buffer identifiers into node storage 504 and deletes the credits from node storage 504 (or marks them as used and does not use them again).

In one embodiment, the child node 305 may redeem credits via the link from which the credit identifiers were received. In such embodiment, child credit redeemer 576 provides the credit identifiers from node storage 506 (or retrieved from the link 306 as described above) to link credit redeemer 686 as part of a redemption request. Link credit redeemer 686 checks to make sure they are stored in link storage 604, and, if so, provides them to central authority redeemer 476 which redeems them for buffer identifiers or provides an indication of an error as described above, sending them to link credit redeemer 686 instead of child credit redeemer 576. If any of the credits are not in link storage 604, link credit redeemer 686 indicates which ones to child credit redeemer 576 as part of an error message, and child credit redeemer 576 may take suitable corrective measures and resubmit a corrected request.

If an error is indicated by central authority redeemer 476, link credit redeemer 686 passes the error to child credit redeemer 576, which may correct the error and resubmit the redemption request. If buffer identifiers are received, link credit redeemer 686 stores the buffer identifiers in link storage 604, removes the credit identifiers redeemed from link storage 604 and then passes the buffer identifiers to child credit redeemer 576, which then stores and processes them as described above, and optionally removes the credit identifiers from node storage 504.

If the child node wishes to release the credits, child credit receiver 570 receives such instructions from operational logic 506 and provides the credit identifiers from node storage 504 to link child manager 628, which checks to see if they are stored in link storage 604. The instructions may be to return a specified number of credits or all remaining credits. If the credit identifiers are not in link storage, link child manager 628 provides the identifiers to child credit receiver 570 which takes suitable corrective measures and resubmits a corrected set of credit identifiers. If the credit identifiers are all in link storage 604, link child manager 628 removes them from link storage 604, provides them to link parent manager 626, which provides them to node credit provider 568 in the parent node. Link child manager 628 confirms the transaction to child credit receiver 570, which removes the credit identifiers from its node storage 504. Node credit provider 568 in the receiving node stores them in node storage 504. (In one embodiment, node credit provider 568 will only provide credits to child nodes that are stored in its node storage 504 or are just received from the central authority).

If a parent node wishes to return credits, node buffer requester 510 returns them to central authority buffer provider 418, which checks to see if they have been redeemed or were not issued to that node. In such case, central authority buffer provider 418 indicates the offending identifiers to node buffer requester 510, which may take suitable corrective measures and resubmit a corrected set of credit identifiers. Otherwise, central authority buffer provider 418 confirms the request, marks the credit identifiers as available for reuse, and node buffer requester 510 removes the credit identifiers from its node storage 504.

The various elements of the node 305 that initiate actions as described herein initiate such actions in response to instructions provided by operational logic 506 of the node 305.

Certain Embodiments of the Present Invention.

Described is a method of allocating two or more buffers, including portions of memory in a computer system, the method including:

requesting, by a parent node to a central authority that manages the two or more buffers for two or more parent nodes including the parent node, two or more credits, each of the credits including a future claim for at least one of the two or more buffers, the parent node and central authority including processes of a computer system;

assigning to the parent node, by the central authority, the two or more credits, responsive to the request;

receiving, by the parent node, the two or more credits from the central authority, responsive to the request;

instantiating, by the parent node, of a child node of the parent node, the child node including a process separate from the parent node;

instantiating, a link between the parent node and the child node;

providing, by the parent node to the link, the two or more credits;

requesting, by the child node, the two or more credits from the link;

providing, by the link, the two or more credits to the child node;

providing, by the child node, at least one of the two or more credits to the central authority;

comparing, by the central authority a maximum number of buffers that can be issued to a node type of the parent node to a number of buffers issued to the parent node, plus the number of the at least one of the two or more credits provided by the child node;

responsive to the maximum number of buffers that can be issued to a node type of the parent node not being less than a number of buffers issued to the parent node, plus the number of the at least one of the two or more credits provided by the child node, providing, by the central authority to the child node, an identifier of a buffer for each of the at least one credits; and recording, by the central authority, each buffer identifier provided.

The method may include additional features whereby the providing the at least one of the two or more credits to the central authority includes:

providing, by the child node, at least one of the two or more credits to the link; and forwarding, by the link, the at least one of the two or more credits to the central authority.

The method:

may additionally include:

recording, by the link, the two or more credits; and comparing, by the link, the at least one of the two or more credits, to the two or more credits recorded; and may include additional features whereby the forwarding by the link is responsive to the comparing by the link.

The method may additionally include providing to the link by the child node, the identifiers of the buffers provided.

The method may additionally include:

providing by the parent node to the link an instruction regarding discarding buffers returned by the child node to the parent node;

providing by the child node to the link the at least one buffer identifier to be returned to the parent node; and providing by the link to the central authority a command to return at least some of the at least one buffer identifier to a pool of available buffer identifiers that will not be returned to the parent node, responsive to the instruction.

The method:

may include additional features whereby the at least one of the two or more credits comprises more than one of the two or more credits; and may additionally include:

providing by the parent node to the link an instruction regarding queueing buffers returned by the child node to the parent node;

providing by the child node to the link the two or more buffer identifiers to be returned to the parent node; and providing by the link to the parent, the two or more buffer identifiers in two or more batches having a size responsive to the instruction.

Described is a system for allocating two or more buffers, including portions of memory in a computer system, the method including:

a node buffer/credit requester at a parent node in two or more parent nodes, for providing at an output a request for two or more credits, each including a future claim on at least one of the two or more buffers, the parent node and central authority including processes of a computer system;

a central authority buffer provider at a central authority that manages the two or more buffers for the two or more parent nodes, the central authority buffer provider having an input coupled to the none buffer/credit requester for receiving the request, the central authority buffer provider for assigning to the parent node, by the central authority the credits responsive to the request, and for providing at an output the two or more credits responsive to the request;

the node buffer/credit requester additionally having an input coupled to the central authority buffer provider for receiving the two or more credits, and for providing the two or more credits at the node buffer/credit requester output;

a node instantiation manager at the parent node for instantiating via an input/output a child node of the parent node, the child node including a process separate from the parent node;

a node credit provider at the parent node, and having an input coupled to the node buffer/credit requester output for receiving the two or more credits, the node credit provider for instantiating via an input/output, a link between the parent node and the child node, and for providing at an output the two or more credits;

a child credit receiver at the link, and having an input coupled to the node credit provider output for receiving the two or more credits and for providing the two or more credits at an output a child credit redeemer at the child node, having an input coupled to the child credit receiver output for receiving the two or more credits, and for providing at least one of the two or more credits at an output;

a central authority redeemer having an input coupled to the child credit redeemer output for receiving the at least one of the two or more credits, the central authority redeemer for comparing a maximum number of buffers that can be issued to a node type of the parent node to a number of buffers issued to the parent node, plus the number of the at least one of the two or more credits received, for providing at an output an identifier of a buffer for each of the at least one credits responsive to the maximum number of buffers that can be issued to a node type of the parent node not being less than a number of buffers issued to the parent node, plus the number of the at least one of the two or more credits received at the central authority redeemer input, and for recording each buffer identifier provided.

The system may additionally include a link credit redeemer having an input coupled to the child credit redeemer output for receiving the at least one of the two or more credits, the link credit redeemer for forwarding via an output coupled to the central authority redeemer input, the at least one of the two or more credits.

The system may include additional features whereby:

the link credit redeemer input is additionally coupled to the node credit provider output for receiving at least some of the two or more credits;

the link credit redeemer is additionally for comparing the at least one of the two or more credits, to the at least some of the two or more credits received at the link credit redeemer input; and the link credit redeemer forwards responsive to the comparing.

The system may additionally include a link child manager at the link having an input coupled to the central authority redeemer output for receiving each buffer identifier, the child manager for recording each buffer identifier received at the link child manager input.

The system may additionally include:

a node buffer provider at the parent node for providing at an output an instruction regarding discarding buffers returned by the child node to the parent node;

a child buffer returner at the child node and having an input coupled to the central authority redeemer output for receiving the at least one buffer identifier, the child buffer returner for providing at an output the at least one buffer identifier to be returned to the parent node; and a link parent manager having an input coupled to the node buffer provider output for receiving the instruction and coupled to the child buffer returner output for receiving the at least one buffer identifier, the link parent manager for providing at an output coupled to an input of a central authority buffer receiver at the central authority a command to return at least some of at least one buffer identifier to a pool of available buffer identifiers managed by the central authority and that will not be returned to the parent node, responsive to the instruction.

The system of claim 7:

may include additional features whereby the at least one of the two or more credits comprises more than one of the two or more credits; and may additionally include:

a node buffer provider at the parent node for providing at an output an instruction regarding queueing buffers returned by the child node to the parent node;

a child buffer returner at the child node and having an input coupled to the central authority redeemer output for receiving the at least one buffer identifier, the child buffer returner for providing at an output the two or more buffer identifiers to be returned to the parent node; and a link parent manager having an input coupled to the node buffer provider output for receiving the instruction and coupled to the child buffer returner output for receiving the two or more buffer identifiers, the link parent manager for providing at an output to an input of a node buffer receiver at the parent node, the two or more buffer identifiers in two or more batches having a size responsive to the instruction.

Described is a computer program product including a computer useable medium having computer readable program code embodied therein for allocating two or more buffers, including portions of memory in a computer system, the computer program product including computer readable program code devices configured to cause a computer system to:

request, by a parent node to a central authority that manages the two or more buffers for two or more parent nodes including the parent node, two or more credits, each of the credits including a future claim for at least one of the two or more buffers, the parent node and central authority including processes of a computer system;

assign to the parent node, by the central authority, the two or more credits, responsive to the request;

receive, by the parent node, the two or more credits from the central authority, responsive to the request;

instantiate, by the parent node, of a child node of the parent node, the child node including a process separate from the parent node;

instantiate, a link between the parent node and the child node;

provide, by the parent node to the link, the two or more credits;

request, by the child node, the two or more credits from the link;

provide, by the link, the two or more credits to the child node;

provide, by the child node, at least one of the two or more credits to the central authority;

compare, by the central authority a maximum number of buffers that can be issued to a node type of the parent node to a number of buffers issued to the parent node, plus the number of the at least one of the two or more credits provided by the child node;

responsive to the maximum number of buffers that can be issued to a node type of the parent node not being less than a number of buffers issued to the parent node, plus the number of the at least one of the two or more credits provided by the child node, provide, by the central authority to the child node, an identifier of a buffer for each of the at least one credits; and record, by the central authority, each buffer identifier provided.

The computer program product may include additional features whereby the computer readable program code devices configured to cause the computer system to provide the at least one of the two or more credits to the central authority comprise computer readable program code devices configured to cause the computer system to:

provide, by the child node, at least one of the two or more credits to the link; and forward, by the link, the at least one of the two or more credits to the central authority.

The computer program product:

may additionally include computer readable program code devices configured to cause the computer system to:

record, by the link, the two or more credits; and compare, by the link, the at least one of the two or more credits, to the two or more credits recorded; and may include additional features whereby the computer readable program code devices configured to cause the computer system to forward by the link are responsive to the comparing by the link.

The computer program product may additionally include computer readable program code devices configured to cause the computer system to provide to the link by the child node, the identifiers of the buffers provided.

The computer program product may additionally include computer readable program code devices configured to cause the computer system to:

provide by the parent node to the link an instruction regarding discarding buffers returned by the child node to the parent node;

provide by the child node to the link the at least one buffer identifier to be returned to the parent node; and provide by the link to the central authority a command to return at least some of the at least one buffer identifier to a pool of available buffer identifiers that will not be returned to the parent node, responsive to the instruction.

The computer program product:

may include additional features whereby the at least one of the two or more credits comprises more than one of the two or more credits; and may additionally include computer readable program code devices configured to cause the computer system to:

provide by the parent node to the link an instruction regarding queueing buffers returned by the child node to the parent node;

provide by the child node to the link the two or more buffer identifiers to be returned to the parent node; and provide by the link to the parent, the two or more buffer identifiers in two or more batches having a size responsive to the instruction.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. Any number of the items discussed in this application may be used.

What is claimed is:

1. A method of allocating a plurality of buffers, comprising portions of memory in a computer system, the method comprising:

requesting, by a parent node to a central authority that manages the plurality of buffers for a plurality of parent nodes comprising the parent node, a plurality of credits, each credit in the plurality comprising a future claim for at least one of the plurality of buffers, the parent node and the central authority comprising processes of the computer system;

assigning to the parent node, by the central authority, the plurality of credits, responsive to the requesting by the parent node step;

receiving, by the parent node, the plurality of credits from the central authority, responsive to the requesting by the parent node step;

instantiating, a link between the parent node and a child node, the child node comprising a process separate from the parent node;

providing, by the parent node to the link, the plurality of credits;

requesting, by the child node, the plurality of credits from the link;

providing, by the link, the plurality of credits to the child node;

23 providing, by the child node, at least one of the plurality of credits to the central authority;

comparing, by the central authority a maximum number of buffers that can be issued to the parent node to which the at least one of the plurality of credits was assigned, to a number of buffers issued to the parent node, plus a number of the at least one of the plurality of credits provided by the child node;

responsive to the maximum number of buffers that can be issued to the parent node not being less than the number of buffers issued to the parent node, plus the number of the at least one of the plurality of credits provided by the child node, providing, by the central authority to the child node, an identifier of a buffer in the plurality for each of the at least one of the plurality of credits provided; and recording, by the central authority, each buffer identifier provided.

2. The method of claim 1, wherein the providing the at least one of the plurality of credits to the central authority comprises:

providing, by the child node, the at least one of the plurality of credits to the link; and forwarding, by the link, the at least one of the plurality of credits to the central authority.

3. The method of claim 2:

additionally comprising:

recording, by the link, the plurality of credits; and comparing, by the link, the at least one of the plurality of credits, to the plurality of credits recorded; and wherein the forwarding by the link is responsive to the comparing by the link.

4. The method of claim 1, additionally comprising providing to the link by the child node, the identifier of each of the at least one buffer provided.

5. The method of claim 1, additionally comprising:

providing by the parent node to the link an instruction regarding discarding buffers returned by the child node to the parent node;

providing by the child node to the link the at least one buffer identifier to be returned to the parent node; and providing by the link to the central authority a command to return at least some of the at least one buffer identifier to a pool of available buffer identifiers that will not be returned to the parent node, responsive to the instruction.

6. The method of claim 1:

wherein the at least one of the plurality of credits comprises more than one of the plurality of credits; and additionally comprising:

providing by the parent node to the link an instruction regarding queueing buffers returned by the child node to the parent node;

providing by the child node to the link the plurality of buffer identifiers to be returned to the parent node; and providing by the link to the parent node, the plurality of buffer identifiers in a plurality of batches, each having a size responsive to the instruction.

7. A system for allocating a plurality of buffers, comprising portions of memory in a computer system, the system comprising:

a node buffer/credit requester at a parent node in a plurality of parent nodes, for providing at an output a request for a plurality of credits, each comprising a future claim on at least one of the plurality of buffers, the parent node and a central authority comprising processes of the computer system;

24 a central authority buffer provider at the central authority that manages the plurality of buffers for the plurality of parent nodes, the central authority buffer provider having an input coupled to the node buffer/credit requester output for receiving the request, the central authority buffer provider for assigning to the parent node, the plurality of credits responsive to the request, and for providing at an output the plurality of credits responsive to the request;

the node buffer/credit requester additionally having an input coupled to the central authority buffer provider output for receiving the plurality of credits, and additionally for providing the plurality of credits at the node buffer/credit requester output;

a node credit provider at the parent node, and having an input coupled to the node buffer/credit requester output for receiving the plurality of credits, the node credit provider for instantiating via an input/output, a link between the parent node and a child node, the child node comprising a process separate from the parent node, and for providing at an output the plurality of credits;

a child credit receiver at the link, and having an input coupled to the node credit provider output for receiving the plurality of credits, the child credit receiver for providing the plurality of credits at an output;

a child credit redeemer at the child node, having an input coupled to the child credit receiver output for receiving the plurality of credits, the child credit redeemer for providing at least one of the plurality of credits at an output;

a central authority redeemer having an input coupled to the child credit redeemer output for receiving the at least one of the plurality of credits, the central authority redeemer for comparing a maximum number of buffers that can be issued to the parent node to which the at least one of the plurality of credits was assigned, to a number of buffers issued to the parent node, plus a number of the at least one of the plurality of credits received, for providing at an output an identifier of a buffer in the plurality for each of the at least one of the plurality of credits, responsive to the maximum number of buffers that can be issued to the parent node not being less than the number of buffers issued to the parent node, plus the number of the at least one of the plurality of credits received at the central authority redeemer input, and for recording each buffer identifier provided.

8. The system of claim 7, additionally comprising a link credit redeemer having an input coupled to the child credit redeemer output for receiving the at least one of the plurality of credits, the link credit redeemer for forwarding via an output coupled to the central authority redeemer input, the at least one of the plurality of credits.

9. The system of claim 8, wherein:

the link credit redeemer input is additionally coupled to the node credit provider output for receiving at least some of the plurality of credits;

the link credit redeemer is additionally for comparing the at least one of the plurality of credits, to the at least some of the plurality of credits received at the link credit redeemer input; and the link credit redeemer forwards responsive to the comparing.

10. The system of claim 7 additionally comprising a link child manager at the link, the link child manager having an input coupled to the central authority redeemer output for receiving each buffer identifier, the link child manager for recording each buffer identifier received at the link child manager input.

11. The system of claim 7, additionally comprising:
a node buffer provider at the parent node for providing at an output an instruction regarding discarding buffers returned by the child node to the parent node;
a child buffer returner at the child node and having an input coupled to the central authority redeemer output for receiving the at least one buffer identifier, the child buffer returner for providing at an output the at least one buffer identifier to be returned to the parent node; and
a link parent manager having an input coupled to the node buffer provider output for receiving the instruction and coupled to the child buffer returner output for receiving the at least one buffer identifier, the link parent manager for providing at an output coupled to an input of a central authority buffer receiver at the central authority a command to return at least some of at least one buffer identifier to a pool of available buffer identifiers managed by the central authority and that will not be returned to the parent node, responsive to the instruction.

12. The system of claim 7:
wherein the at least one of the plurality of credits comprises more than one of the plurality of credits; and
additionally comprising:
a node buffer provider at the parent node for providing at an output an instruction regarding queueing buffers returned by the child node to the parent node;
a child buffer returner at the child node and having an input coupled to the central authority redeemer output for receiving the at least one buffer identifier, the child buffer returner for providing at an output the plurality of buffer identifiers to be returned to the parent node; and
a link parent manager having an input coupled to the node buffer provider output for receiving the instruction and coupled to the child buffer returner output for receiving the plurality of buffer identifiers, the link parent manager for providing at an output to an input of a node buffer receiver at the parent node, the plurality of buffer identifiers in a plurality of batches, each having a size responsive to the instruction.

13. A computer program product comprising a nontransitory computer useable medium having computer readable program code embodied therein for allocating a plurality of buffers, comprising portions of memory in a computer system, the computer program product comprising computer readable program code devices configured to cause a computer system to:
request, by a parent node to a central authority that manages the plurality of buffers for a plurality of parent nodes comprising the parent node, a plurality of credits, each credit in the plurality comprising a future claim for at least one of the plurality of buffers, the parent node and the central authority comprising processes of the computer system;
assign to the parent node, by the central authority, the plurality of credits, responsive to the request by the parent node;
receive, by the parent node, the plurality of credits from the central authority, responsive to the request by the parent node;

instantiate, a link between the parent node and a child node, the child node comprising a process separate from the parent node;
provide, by the parent node to the link, the plurality of credits;
request, by the child node, the plurality of credits from the link;
provide, by the link, the plurality of credits to the child node;
provide, by the child node, at least one of the plurality of credits to the central authority;
compare, by the central authority a maximum number of buffers that can be issued to the parent node to which the at least one of the plurality of credits was assigned, to a number of buffers issued to the parent node, plus a number of the at least one of the plurality of credits provided by the child node;
responsive to the maximum number of buffers that can be issued to the parent node not being less than a number of buffers issued to the parent node, plus the number of the at least one of the plurality of credits provided by the child node, provide, by the central authority to the child node, an identifier of a buffer in the plurality for each of the at least one of the plurality of credits provided; and
record, by the central authority, each buffer identifier provided.

14. The computer program product of claim 13, wherein the computer readable program code devices configured to cause the computer system to provide the at least one of the plurality of credits to the central authority comprise computer readable program code devices configured to cause the computer system to:
provide, by the child node, the at least one of the plurality of credits to the link; and
forward, by the link, the at least one of the plurality of credits to the central authority.

15. The computer program product of claim 14:
additionally comprising computer readable program code devices configured to cause the computer system to:
record, by the link, the plurality of credits; and
compare, by the link, the at least one of the plurality of credits, to the plurality of credits recorded; and
wherein the computer readable program code devices configured to cause the computer system to forward by the link are responsive to the comparing by the link.

16. The computer program product of claim 13, additionally comprising computer readable program code devices configured to cause the computer system to provide to the link by the child node, the identifier of each of the at least one buffer provided.

17. The computer program product of claim 13, additionally comprising computer readable program code devices configured to cause the computer system to:
provide by the parent node to the link an instruction regarding discarding buffers returned by the child node to the parent node;
provide by the child node to the link the at least one buffer identifier to be returned to the parent node; and
provide by the link to the central authority a command to return at least some of the at least one buffer identifier to a pool of available buffer identifiers that will not be returned to the parent node, responsive to the instruction.

18. The computer program product of claim 13:
wherein the at least one of the plurality of credits comprises more than one of the plurality of credits; and additionally comprising computer readable program code devices configured to cause the computer system to:

provide by the parent node to the link an instruction regarding queueing buffers returned by the child node to the parent node;

provide by the child node to the link the plurality of buffer identifiers to be returned to the parent node; and provide by the link to the parent node, the plurality of buffer identifiers in a plurality of batches, each having a size responsive to the instruction.

* * * * *